United States Patent [19]

Hong et al.

[11] Patent Number: 5,796,886
[45] Date of Patent: Aug. 18, 1998

[54] OPTICAL COUPLER 2×2 OPTICAL SWITCH AND METHOD FOR OPTICAL SWITCHING THEREWITH

[75] Inventors: Song-Cheol Hong; Doo-Young Ha, both of Taejon. Rep. of Korea

[73] Assignee: Korea Advanced Institute of Science and Techanology, Taejon. Rep. of Korea

[21] Appl. No.: 669,691

[22] Filed: Jun. 24, 1996

[30] Foreign Application Priority Data

Jun. 24, 1995 [KR] Rep. of Korea ............ 95-17254

[51] Int. Cl.$^6$ ............................................. G02B 6/35
[52] U.S. Cl. ............................. 385/21; 385/25; 385/40; 385/50
[58] Field of Search ............................. 385/15, 16, 18, 385/19, 20, 21, 25, 30, 39, 40–42, 50, 52

[56] References Cited

U.S. PATENT DOCUMENTS

| | | | |
|---|---|---|---|
| 4,365,862 | 12/1982 | Terui et al. | 385/25 X |
| 4,400,053 | 8/1983 | Kazkaz | 385/39 |
| 4,483,583 | 11/1984 | Unger | 385/50 X |
| 5,251,275 | 10/1993 | Kuriyama et al. | 385/50 X |
| 5,367,584 | 11/1994 | Ghezzo et al. | 385/19 X |

OTHER PUBLICATIONS

John J. Veselka & Steven K. Korotsky. Optimization of Ti:LiNbO$_3$ Optical Waveguides and Directional Coupler Switches for 1.56 μm Wavelength. IEEE J. Quantum Electron., QE–22(6):933–938(1986) (Jun.).

Kurt E. Petersen, Dynamic Micromechanics on Silicon: Techniques and Devices. IEEE Trans. Electron Device, ED–25(10):1241–1250(1978) (Oct.).

S.M. Sze. Mechanical Sensors. Semiconductor Sensors, 191:185–195(1994) (no month).

*Primary Examiner*—John D. Lee
*Attorney, Agent, or Firm*—Darby & Darby

[57] ABSTRACT

The present invention relates to an optical coupler 2×2 optical switch which can efficiently shorten the length of device by employing a cantilever and a movable optical waveguide and a method for optical switching with the optical coupler 2×2 optical switch. An optical coupler 2×2 optical switch of the present invention comprises: an optical coupler in which two fixed optical waveguides are provided on a substrate; an optical waveguide positioned between the fixed optical waveguides, which is moved up and down; and, a cantilever which is linked to the optical waveguide to move the optical waveguide up and down by the voltage applied to electrodes. Since the coupling length of the optical coupler(22) is changed depending on the distance between the fixed optical waveguides(21, 21') and the optical waveguide(23), length(D) of the optical, coupler(22) can be shortened to a great extent compared to the prior art optical coupler 2×2 optical switch, and the insertion loss of the device in the construction of optical communication system can be lowered significantly and optical switching can be carried out with a good performance.

4 Claims, 2 Drawing Sheets

OPTICAL COUPLER 2×2 OPTICAL SWITCH AND METHOD FOR OPTICAL SWITCHING THEREWITH

FIELD OF THE INVENTION

The present invention relates to an optical coupler 2×2 optical switch and a method for optical switching therewith, more specifically, an optical coupler 2×2 optical switch which can efficiently shorten the length of a device by employing a cantilever and a movable optical waveguide and a method for optical switching with the optical coupler 2×2 optical switch.

BACKGROUND OF THE INVENTION

A variety of optical communication systems have been developed, in a view of the importance of info-communication. The optical switching device, e.g., N×N optical switch, plays a significant role in the optical communication system. Since the N×N optical switch can be fabricated by the combination of a number of 2×2 optical switches, a high quality of optical switch is indispensable to construct a good optical communication system. However, a superior optical switch has not been developed so far, due to the technical limitation in the art.

On the other hand, 2×2 optical switches employing optical couplers as followings have been widely applied in the industry:

Somekh et al and Veselka et al disclose an optical coupler 2×2 optical switch consisting of two optical waveguides(11, 11') employing Ti:LiNbO₃, as schematically depicted in FIG. 1(see: Somekh et al., Appl. Phys. Lett., 27:327(1975); J. J. Veselka et al., IEEE J. Quan. Elec., QE-22:933(1986)). When electric field is applied to said optical coupler 2×2 optical switch which utilizes the electro-optic effect of optical coupler, the refractive index of two optical waveguides(11, 11') is varied so as to change a propagation constant, which, in turn, changes coupling length finally to achieve optical switching. The prior art optical coupler 2×2 optical switch is, however, proven less satisfactory, in the sense that insertion loss becomes larger in the construction of optical communication system and sensitivity of the optical switch becomes lowered, since the length(d) of the optical coupler 2×2 optical switch is relatively long.

Under the circumstance, the optical coupler 2×2 optical switch has not been practically applied in the art and there are strong reasons for exploring and developing a novel optical coupler 2×2 optical switch which can shorten the length of device in an efficient manner.

SUMMARY OF THE INVENTION

A primary object of the present invention is, therefore, to provide an optical coupler 2×2 optical switch which can shorten the length of device and has a high sensitivity of is optical switching, and in which insertion loss can be lowered significantly.

The other object of the invention is to provide a method for optical switching with the optical coupler 2×2 optical switch.

BRIEF DESCRIPTION OF DRAWINGS

The above and the other objects and features of the present invention will become apparent from the following descriptions given in conjunction with the accompanying drawings, in which.

DETAILED DESCRIPTION OF THE INVENTION

An optical coupler 2×2 optical switch of the present invention comprises:

an optical coupler in which two fixed optical waveguides are provided on a substrate;

an optical waveguide positioned between the fixed optical waveguides, which is moved up and down: and, a cantilever which is linked to the optical waveguide to move the optical waveguide up and down by the voltage applied to electrodes.

A method for optical switching of the invention comprises the steps of:

(i) moving an optical waveguide which is linked to a cantilever up and down in the space, of fix optical waveguides by the voltage applied to the electrodes of an optical coupler 2×2 optical switch.

(ii) changing the coupling length of the optical coupler by up-and-down movement of the optical waveguide; and, (iii) changing the output power of toe optical coupler by the change of the coupling length of the optical coupler.

A preferred embodiment of the resent invention is explained in detail with references of the accompanying drawings, which should not be taken to limit the scope of the invention.

Figure 1:
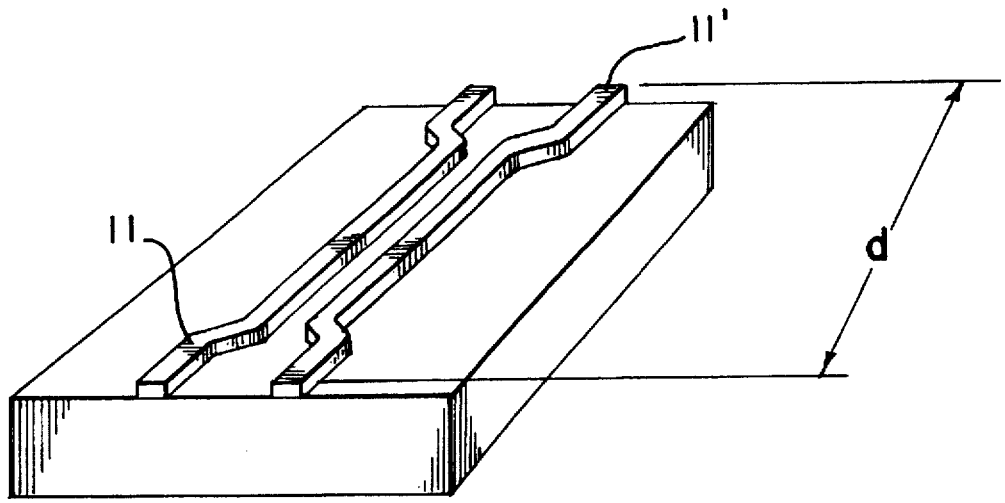
FIG. 1 is a schematic diagram of an optical coupler 2×2 optical switch of prior art.
Figure 2A:
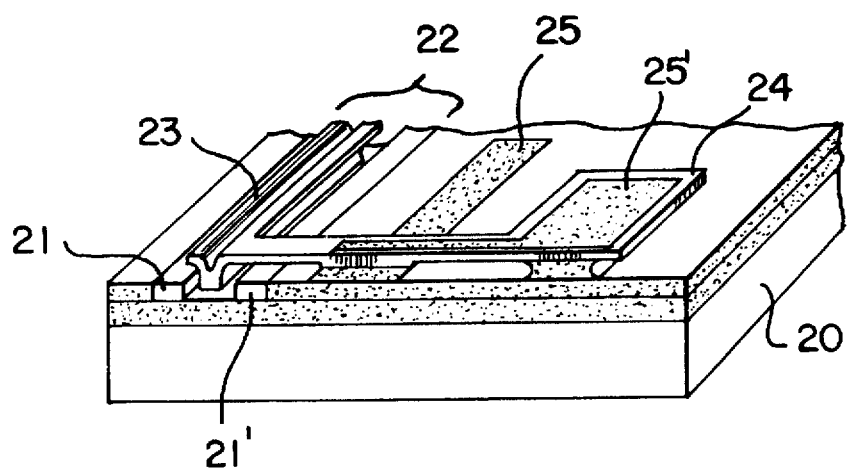
FIG. 2(A) is a partial perspective view of an optical coupler 2×2 optical switch of the present invention.
Figure 2B:
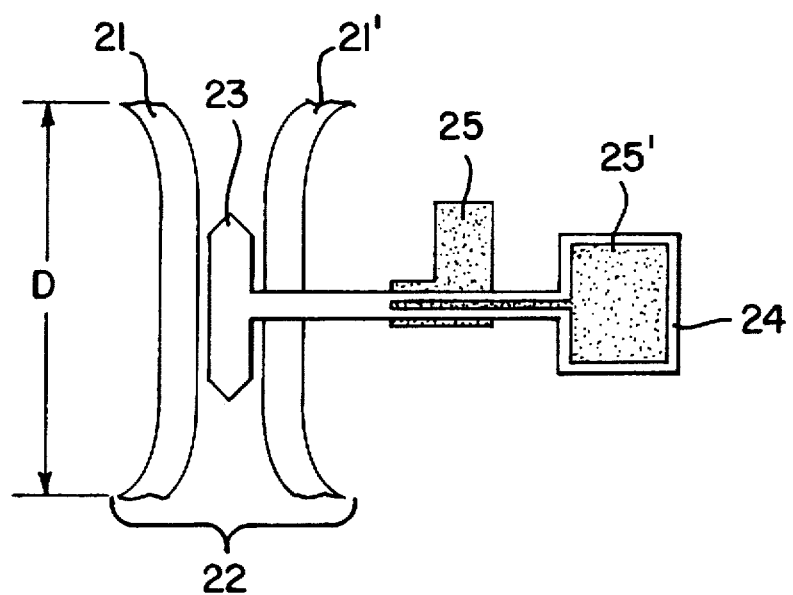
FIG. 2(B) is a top view-of an optical coupler 2×2 optical switch of the present invention.

FIGS. 2(A) and 2(B). are a partial perspective and a top views of an optical coupler 2×2 optical switch of the present invention, respectively. An optical coupler 2×2 optical switch of the present invention comprises an optical coupler (22) whose substrate(20) is provided with two fixed optical waveguides(21, 21'); an optical waveguide(23) positioned between the fixed optical waveguides(21, 21') of the optical coupler(22), which is moved up and down; and, a cantilever (24) which is linked to the optical waveguide(23) to move the optical waveguide up and down by the voltage applied to electrodes(25, 25').

The fixed optical waveguide(21, 21') can be formed on the substrate(20) of the optical coupler(22) by the conventional method in the art, and the cantilever(24) linked to the optical waveguide(23) which is moved up and down by the electric field can be formed by the conventional micromachining method in the art(see: K. E. Petersen, IEEE Trans. Electron. Devices, ED25:1241(1978)).

The cantilever(24) and the optical waveguide(23) linked thereto are moved up and down, by the voltage applied to two electrodes(25, 25') of the optical coupler 2×2 optical switch, where the movement of optical Waveguide(23) can be regulated by controlling the voltage applied to the cantilever in the space of fixed optical waveguides by the voltage applied to the electrodes of an optical coupler 2×2 optical switch, changing the coupling length of the optical coupler by up-and-down movement of the optical waveguides and changing the output power of the optical coupler by the change of the coupling length of the optical coupler are performed in a serial manner.

Since the coupling length of the optical coupler(22) is changed depending on the distance between the fixed optical waveguides(21, 21') and the optical waveguide(23), length (D) of the optical coupler(22) can be shortened to a great extent compared to the prior art optical coupler 2×2 optical switch, and the insertion loss of device in the construction of optical communication system can be lowered significantly and optical switching can be carried out with a good performance.

Although the preferred embodiments of the present invention have been disclosed for illustrative purpose, it will be apparent to those skilled in the art that certain changes and modifications can be made to this invention without departing from the spirit or scope of the invention as it is set forth herein.

What is claim is:

1. An optical coupler 2×2 optical switch which comprises:

a pair of electrodes spaced apart in a first direction for receiving an applied voltage;

an optical coupler in which two fixed optical waveguides are provided on a substrate;

a movable optical waveguide positioned between the fixed optical waveguides, which is moved up and down in a second direction perpendicular to the first direction; and, a cantilever which is linked to the movable optical waveguide to move the movable optical waveguide up and down in the second direction by the voltage applied to the electrodes.

2. A method for optical switching which comprises the steps of:

(i) moving a movable optical waveguide which is linked to a cantilever up and down in a second direction perpendicular to a first direction in a space between fixed optical waveguides by a voltage applied to a pair of electrodes of an optical coupler of an optical coupler 2×2 optical switch, with the pair of electrodes spaced apart in the first direction; and (ii) changing the coupling length of the optical coupler by the movement of the movable optical waveguide up and down in the second direction, thereby changing the output power of the optical coupler by changing the coupling length of the optical coupler.

3. An optical switch which comprises:

a substrate;

an electrode for receiving an applied voltage;

first and second fixed optical waveguides disposed on the substrate;

a movable optical waveguide positioned between the first and second fixed optical waveguides, wherein the movable optical waveguide moves in a predetermined direction; and a cantilever which is linked to the movable optical waveguide, the cantilever being responsive to the applied voltage to the electrode for moving the movable optical waveguide in opposing directions parallel to the predetermined direction.

4. The optical switch of claim 3 wherein the predetermined direction is oriented vertically, and the movable optical waveguide moves in opposing directions corresponding to up and down vertical directions.

* * * * *